Aug. 31, 1965        V. F. BERRY ETAL        3,203,777
                     GLASS FORMING METHOD
Filed Nov. 20, 1961                          3 Sheets-Sheet 1
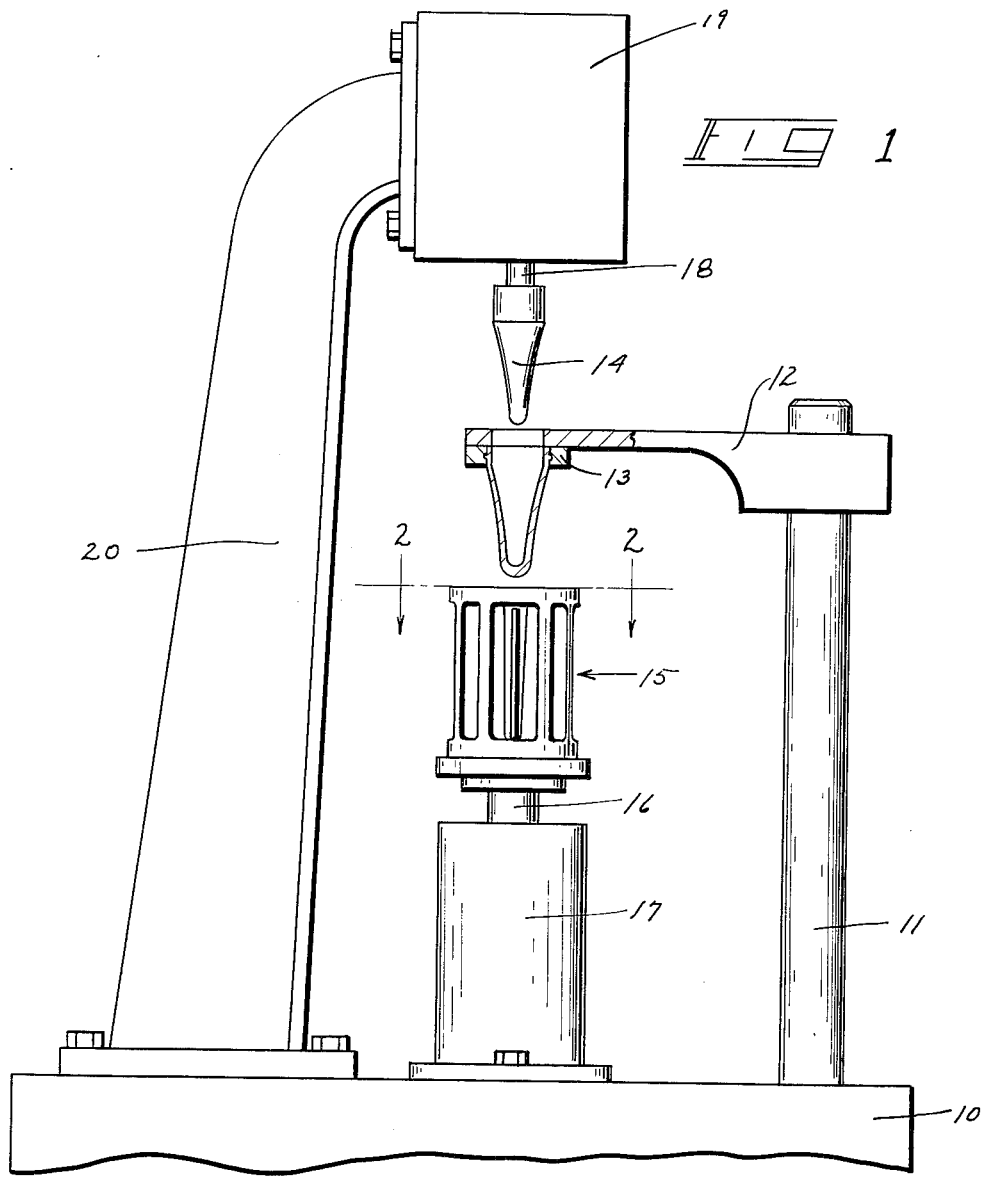
INVENTORS
V. F. Berry, D. A. McGraw
and T. J. Naughton
BY W. A. Schaich &
D. T. Innis
ATTORNEYS

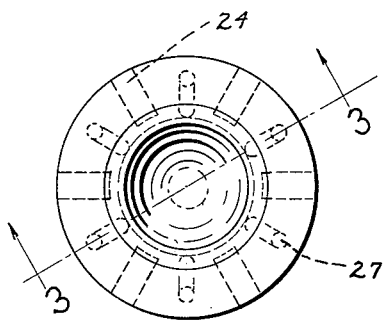
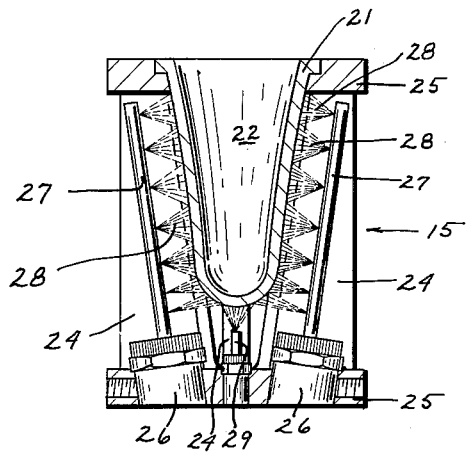
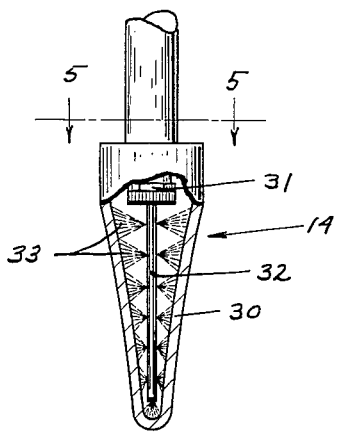
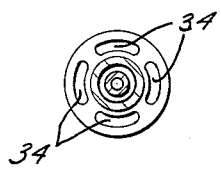

Aug. 31, 1965   V. F. BERRY ETAL   3,203,777
GLASS FORMING METHOD
Filed Nov. 20, 1961   3 Sheets-Sheet 3

INVENTORS
V. F. Berry, D. A. McGraw
and J. J. Naughton
BY W. A. Schaich
G. J. Jennis
ATTORNEYS

United States Patent Office 3,203,777
Patented Aug. 31, 1965

3,203,777
GLASS FORMING METHOD
Virgil F. Berry and Delford A. McGraw, Toledo, and Thomas J. Naughton, Maumee, Ohio, assignors to Owens-Illinois Glass Company, a corporation of Ohio
Filed Nov. 20, 1961, Ser. No. 153,328
3 Claims. (Cl. 65—24)

This invention relates to a method for forming hollow glass articles. More particularly, this invention relates to a method for cooling glass working implements which will form successive parisons, or other hot glass contacting elements which need to be continuously cooled so as to provide glass having predetermined heat content.

At the present time the utilization of air as a cooling medium is by far the most prevalent means for cooling glass forming molds and plungers. However, with the trend toward higher machine speeds through the improvement of existing machines and development of new machines, the application of air cooling is approaching its limit of effectiveness. Obviously, as machines operate at higher speeds, it is necessary that a greater amount of heat be removed from the parison mold and plunger and this has necessitated redesign of molding equipment and the utilization of increased capacity compressors and blowers.

Furthermore, when wind velocities are already extremely high, a further increase in wind velocity does not produce a corresponding increase in cooling capacity. In view of this situation the use of air is rapidly becoming a costly and inefficient operation for many jobs. Cooling by the circulation of water has seen only limited use. Thick mold sections are required, as the heat removal rate is determined by the mold wall thickness, hence water cooled equipment offers little flexibility of regulation and in situations where it is desired to provide differential cooling, as between vertical areas of a parison mold, the adjustability of water circulation cooling is extremely limited and expensive.

In view of the foregoing, applicants have discovered a method of cooling mold equipment which takes advantage of the enormous heat absorption that occurs when water changes to steam. By utilizing a water mist spray, which is directed against the mold surfaces, which spray is completely evaporated upon its initial contact with the hot mold, a substantially greater quantity of heat may be removed from the mold than is possible by utilizing air alone or water alone.

While cooling efficiency is the principal advantage of water mist spray cooling, several other advantages are present. One advantage is that the water mist spray cooling is as flexible as the presently used air cooling. Another advantage is that it is no longer necessary to use large capacity compressors and pumps because the water mist spray generation uses less than 10 percent of the volume of compressed air needed for conventional wind cooling.

By way of illustration of applicants' theory of evaporation cooling, consider one fluid ounce of water at 60° F. in the shape of a sphere suspended in a container filled with dry air at standard pressure. The inner surfaces of the container are held constant at 500° F. The temperature of the liquid water will rise rapidly to 212° F. As the boiling point is reached, a high energy molecule of water escapes into the surroundings, and consequently, the average temperature of the particles remaining in the liquid phase will be somewhat lower due to its loss. The sphere is instantaneously reheated to the boiling point by the surroundings; another molecule escapes and the sphere's temperature drops again. In the meantime, the temperature of the liquid water does not exceed the boiling point, and the temperature of the surroundings remains between 212° F. and the inner wall temperature of 500° F. Only after vaporization is completed will the mixture within the container approach the inner wall temperature.

Thus it can be seen that three distinct stages occur during the evaporation process. In the first stage, only liquid water and dry air are within the container. In the second stage, liquid water, dry air and water vapor are present, while the third stage is composed of water vapor and dry air mixed to form moist air. During the first stage of the process the ounce of water absorbs 9.9 B.t.u. while increasing its temperature by 152° F. In the second stage, a considerably greater amount of energy is consumed by the ounce of water passing to the vapor state and will be 63.2 B.t.u. Thus the total of 73.1 B.t.u. are removed from the walls of the container during the first two stages. For the sake of comparison, the energy needed to elevate an equal mass of dry air to the same level is only 2.4 B.t.u. In applying this theory to the problem of cooling mold equipment by utilizing water mist spray, several factors must be considered. It has been determined that for water mist spray to be satisfactory and efficient as a coolant, complete evaporation must occur adjacent to the outer mold surfaces. This is only possible with small, atomized water particles propelled toward the mold surface at a fairly high velocity. The time required for complete evaporation of water drops is dependent upon a number of factors. The primary factor involved is the relationship between the surface area of the drop and its volume. As the size of the liquid water sphere diminishes through evaporation, the exposed surface relative to the volume becomes large, and the evaporation rate increases.

With this in mind, the primary requisite for a spray nozzle, selected to provide cooling by vaporization, is that it generate particles within a size range to insure complete vaporization adjacent to the mold surfaces and propel the particles with sufficient velocity to penetrate to the mold surface.

With reference to FIG. 6 there is shown three curves which represent the time for complete evaporation of water drops over a range of drop sizes. The three curves designated A, B, and C represent temperature differences between the water droplets and the mold surface which is being cooled. Specifically, curve A represents a temperature difference of 800° F., curve B represents a temperature difference of 500° F. and curve C represents a temperature difference of 200° F. Take, for example, curve B which represents the 500° F. temperature difference between the drop and its surroundings. If a particle 200 microns in diameter will vaporize in one second, a particle 20 microns in size will require only .01 second. Thus a change of 10 in diameter of the particle effects the vaporization rate by the factor of 100. This is in part due to the fact that for the same mass of water, there is 10 times more surface exposed with drops of 20 micron diameter than with those of 200 micron diameter. As can be seen by the relationship of the three curves, A, B, and C, the temperature difference between the drop of water and the surroundings is a factor to be considered. A drop 20 microns in diameter flashes to the vapor state in .01 second if the difference in temperature is 500° F. but a 20 micron drop will require .03 second if the temperature difference is decreased to 200° F. To have the evaporation rate remain .01 second at the lower thermal condition, it is necessary to diminish the initial droplet size to 12 microns. Other factors which determine times for complete evaporation and which tend to be constant for a water air process, are the latent heat of vaporization, the density of the liquid and surroundings, and the film conductivity of the surroundings.

When viewing FIG. 7, which was prepared from experimental data, it can be seen that the mass flow ratio of air to water will determine the size of the water droplets issuing from a spray nozzle. At mass flow ratio values below .55, the spray will be relatively non-hemogeneous and as indicated by the shaded area D, there will be a range of droplet sizes present in the spray.

As the mass flow ratio increases, the size of the average droplet diminishes and the spray becomes more uniform. Mass flow ratios greater than .55 result in generally homogeneous sprays. With the aid of FIGS. 6 and 7, one is able to calculate the ratio of air and water flow necessary for a water mist spray cooling pattern. As pointed out above, in cooling glass forming molds a complete vaporization of individual droplets must occur during an interval of about .01 second if cooling efficiencies are to be maintained at an optimum level.

FIG. 6 shows that, as a practical matter under temperature conditions normally encountered in present glass forming equipment, a droplet must be 30 microns or smaller in diameter to accomplish this result. With this in mind and by utilizing FIG. 7, it can be seen that a mass flow ratio of at least .93 is necessary to generate the desired particle size. To determine the droplet sizes using the mass flow ratio, one must only measure the air and water flow volume rates and convert them to mass units or measure mass flow rates directly.

It should be emphasized that the above referred-to practical limit of 30 microns for the particle size is a limit determined by temperature conditions existing in present day forming machines and for operating at optimum efficiencies. However, droplet sizes as great as 80 microns could be utilized with less than optimum efficiency. A droplet size of 80 microns would be the optimum size only if the temperature difference between the droplet and the mold surface was near 2000° F. An examination of FIG. 7 indicates that a mass flow ratio of at least .55 is necessary to insure delivery of a spray having a homogeneous droplet size. Also the maximum droplet size that may be produced in a homogeneous spray is 80 microns.

With the foregoing in mind it is an object of this invention to provide a methed for cooling glass molding equipment.

It is an additional object of this invention to provide a method for cooling forming molds on a glass machine.

It is a further object of this invention to provide a method for internally cooling a glass pressing plunger.

It is a still further object of this invention to provide a method for cooling hot, glass working elements through the use of water mist spray.

Other and further objects and advantages will be apparent from the following description taken in conjunction with the attached drawings wherein:

FIG. 1 is a schematic, elevational view partly in section showing the parison or blank forming station of a glass forming machine.

FIG. 2 is a top plan view of the parison mold of FIG. 1 taken at line 2—2 on FIG. 1.

FIG. 3 is a sectional elevation of the parison mold taken at line 3—3 on FIG. 2.

FIG. 4 is a part sectional view of a pressing plunger illustrating the positioning of the spray nozzle therein.

FIG. 5 is a cross-sectional view taken at line 5—5 on FIG. 4.

Figure 6:
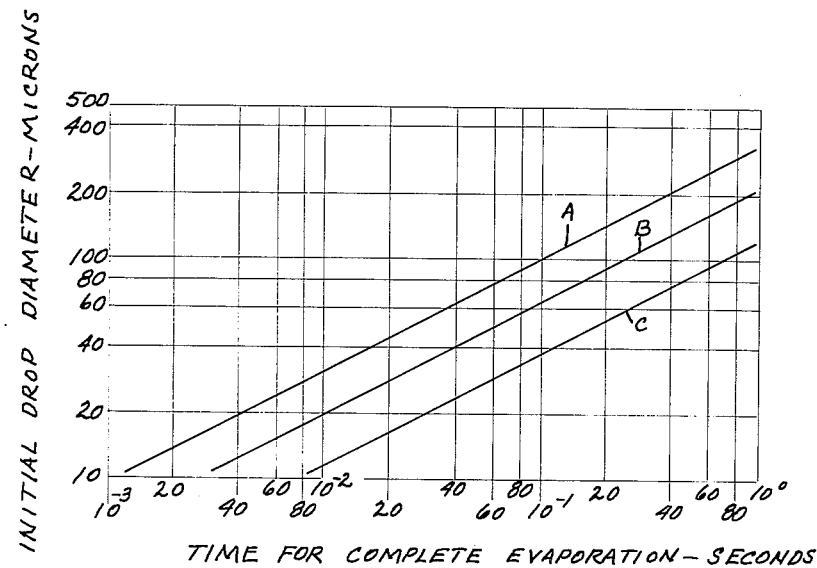
FIG. 6 is a graph illustrating the relationship between particle sizes and evaporation rate.
Figure 7:
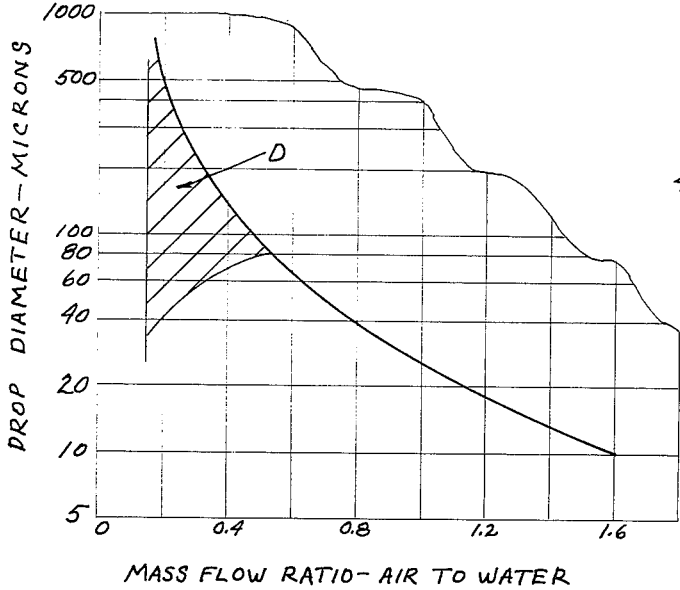
FIG. 7 is a graph illustrating the relationship between particle sizes or drop diameter with respect to the mass flow ratio of air to water formed in the spray.

The invention is illustrated in connection with the forming of hollow parisons, it being understood that the invention also has application to other glass forming molds and glass working elements, for example, blow molds.

With particular reference to FIG. 1 there is shown in schematic form a parison forming station of a bottle forming machine. A base 10 has mounted thereon a vertically extending shaft 11 which is adapted to support a neck mold carrying turret 12. The turret 12 is adapted to position a neck ring 13 in axial alignment with a pressing plunger 14 and parison mold 15. The parison mold 15 is mounted for vertical movement on a piston rod 16 which is reciprocated by fluid motor 17 mounted on the base 10. The plunger 14 also is mounted on a piston rod 18 which is reciprocated by a fluid motor (not shown) contained within the upper housing 19. The housing 19 is supported in overlying relationship with respect to the parison mold 15 by means of a bracket 20 which is bolted to the base 10.

With specific reference to FIGS. 2 and 3 the details of the parison mold 15 will be described. The parison mold, generally designated 15, is comprised of a mold body 21 having fairly constant wall thickness throughout, and its inner surface forms a parison cavity 22. The mold body 21 is mounted within a mold supporting cage 23 which comprises vertical rib members 24 which generally conform throughout their height to the outer surface of the mold body 21. The ribs 24 are joined together at their tops and bottoms by horizontal plate-like members 25. A plurality of openings are formed through the bottom plate-like member 25 within which spray nozzles 26 are adapted to be mounted. Each spray nozzle 26 has a tubular extension 27 connected thereto which extends generally vertical as shown in FIG. 3 in parallel relationship to the sidewalls of the mold body 21. Each tubular extension 27 contains a plurality of openings therein in fixed relationship with respect to the outer surface of the mold body 21. Upon the application of fluid under pressure, that is, a mixture of water and air, each opening will direct a spray having a pattern such as that schematically shown in FIG. 3 at 28. In this manner water mist spray is directed against the outer wall surface of the mold body 21. It should be noted that the tubular members 27 are relatively close to the surface of the mold body for the reason that if too great a distance is required to be spanned by the spray, the particles forming the spray will recombine and form droplets having sizes which are too large to evaporate within the .01 second time required for complete evaporation.

In order to avoid having a hot spot at the lower end of the parison cavity, a spray nozzle 29 is positioned axially below the mold body and generates a spray having a pattern which encompasses the area of the lower end of the mold body 21.

It should be understood that the size of the openings formed in the tubular extension 27 and the angle with which they direct the spray pattern against the sidewall of the mold body are selected for optimum cooling of the parison mold depending upon the type ware being formed. In those situations where it is desirable to provide a chill pattern in the parison, for example, as illustrated in Weber Pat. No. 2,688,823, issued September 14, 1954, the relative size or spacing of the openings may be changed so as to provide greater chilling in those horizontal zones where a greater amount of chill is desired to be effected in the parison.

It should be understood that depending upon the cooling requirements indicated by the type of ware being formed that the tubular extension 27 and the openings may be selectively replaced or changed.

While the above description has been directed toward the cooling of a solid one-piece parison mold, it should be understood that the principle of the invention could be equally applied to split parison molds or narrow neck parison molds of the type shown in U.S. Pat. 2,984,047, issued May 16, 1961. Furthermore, the principle of the invention is readily adapted to other cooling problems that are encountered in hot glass forming or handling equipment.

In addition to the desirability of cooling glass forming molds, it is also desirable to be able to efficiently and controllably cool glass shaping elements, for example, pressing plungers. An illustration of a pressing plunger cooled in accordance with the present invention is illustrated in FIGS. 4 and 5.

With reference to FIG. 4 the pressing plunger, generally designated 14, is comprised of a partially shaped glass contacting element 30. The element 30 is formed of an elongated hollow member which is cooled internally. Cooling of the element 30 is accomplished by positioning a spray nozzle 31 which is similar in structure to that disclosed in FIG. 3 at 26 and is illustrated in greater detail in FIG. 8. The nozzle 31 carries a tubular extension 32 which extends coaxially substantially the full length of the chamber formed within hollow element 30. A plurality of openings are formed both longitudinally and circumferentially about the tubular extension 32. The openings are positioned and arranged so as to provide a spray pattern 33, as illustrated in FIG. 4, such that the entire inner surface of the element 30 will be encompassed by the combined spray patterns 33 formed by the openings in the tubular extension 32. As previously stated with respect to the cooling of the parison mold, it is also important when cooling a plunger that a water mist spray be utilized and that the size of the water droplets forming the spray be small enough that they will be completely evaporated adjacent the hot inner surface of the plunger.

Furthermore, from the standpoint of operability, it has been applicants' experience that it is necessary to permit the steam, which is formed by the evaporation of water droplets within the plunger cavity, to be vented in symmetrical manner.

Thus with particular reference to FIG. 5, four vent openings 34 are provided in the top wall of the plunger mounting so as to allow the steam to leave the cavity and prevent any of the steam being trapped at any particular area within the plunger body.

Figure 8:
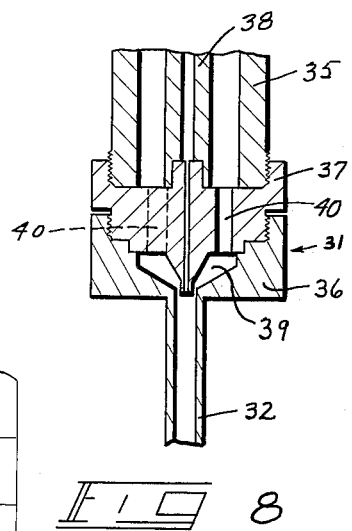
FIG. 8 is a detailed sectional view through a representative spray nozzle, on an enlarged scale.

As an example of a spray nozzle which can be utilized in either of the applications illustrated in FIGS. 3 and 4, reference may be had to FIG. 8 wherein a detailed cross-sectional view of a water mist spray nozzle is shown. This nozzle, which has been generally designated 31 corresponding to the nozzle utilized for internally cooling the plunger 14, comprises an elongated tubular member 35 which is adapted to conduct air under pressure to the interior of a spray forming head 36 which is mounted on the end of the member 35 by means of a threaded sleeve 37. A second tubular member 38 extends coaxially within the member 35 and is adapted to conduct water under pressure to the threaded sleeve 37. The sleeve 37 has a relatively small axial opening therethrough which is open at its lower end at the apex of a conical extension formed on the sleeve 37. The head 36 has a conical chamber 39 formed therein. The apex of the conical chamber 39 corresponds generally to the apex of the conical extension formed on the threaded sleeve 37. Upon the introduction of air under pressure through the first tubular member 35, the air will be conducted through openings 40 formed in the threaded sleeve 37 to permit the air to enter chamber 39. The air leaving the chamber 39 will pass in close proximity to the lower opening formed in the threaded sleeve 37 through which water under pressure is fed from the second tubular member 38. In this manner the air and water are efficiently mixed and the water is atomized into fine droplets. The air-water mixture will be fed down through the tubular extension 32 where it is conducted through openings formed therein to direct the spray against the surface to be cooled.

While a spray nozzle has been described in some detail, it should be apparent that other spray generating means having different structural characteristics would be equally applicable.

As a particular example of a spray generating nozzle suitable for use in the present invention reference may be had to Catalogue No. 24 of the Spraying Systems Co., Bellwood, Illinois, published in 1953.

It should be understood, however, that the generation of water mist spray must be such that the particle size be less than 80 microns in order to provide an effective and homogeneous cooling medium for the glass working implement.

Furthermore, with the nozzle disclosed herein, particularly in FIG. 8, after a cooling pattern is selected, there are two variables involved in the operation of the nozzle. The first is the air pressure which is the driving force of the spray and the second is the water pressure which determines the amount of water introduced into the mixture. It has been seen that the pattern remains relatively unchanged when the water pressure is altered but it is not maintained when the air pressure is changed. Thus it can be seen that the air pressure is held constant while determining the pattern and then after the pattern has been arrived at, it is only necessary to change the water pressure when it is desired to change the mass flow ratio and in effect, change the cooling properties of the water mist spray.

Various modifications may be resorted to within the spirit and scope of the appended claims.

We claim:

1. The method of cooling a glass working implement having two opposed surfaces, one of which is in contact with hot glass and heat is conducted to the other non-glass contacting surface, comprising spraying a water-air mist into direct contact with the non-glass contacting surface of said implement, wherein the mist is formed of water droplets having a size in the range of 10–80 microns.

2. The method of cooling a molten glass shaping element in which one surface of the element makes direct contact with the molten glass, comprising the steps of directing a plurality of air-atomized water sprays against a surface of said shaping element, the sprayed surface being opposite to the glass contacting surface and heat is conducted through the element to the sprayed surface and wherein the droplet size of the water in the spray is maintained in the range of 10–80 microns so that all the water is converted to steam adjacent the surface of the hot shaping element.

3. The method of cooling a molten glass shaping element in which one surface of the element makes direct contact with the molten glass, comprising the steps of directing a plurality of air-atomized water sprays against a surface of said shaping element, the sprayed surface being opposite to the glass contacting surface and heat is conducted through the element to the sprayed surface and wherein the droplet size of the water in the spray is maintained in the range of 10–30 microns so that all the water is converted to steam adjacent the surface of the hot shaping element.

References Cited by the Examiner

UNITED STATES PATENTS

| | | | |
|---|---|---|---|
| 1,633,028 | 6/27 | La France | 65—355 |
| 2,167,919 | 8/39 | Wadsworth | 65—355 |
| 2,402,475 | 6/46 | Waterbury et al. | 65—355 |
| 2,688,823 | 9/54 | Weber | 65—355 XR |
| 3,027,685 | 4/62 | Cooke | 65—356 |
| 3,084,874 | 4/63 | Jones et al. | 239—524 |

DONALL H. SYLVESTER, *Primary Examiner.*